United States Patent Office 2,952,514
Patented Sept. 13, 1960

2,952,514
PREPARATION OF INORGANIC FLUORIDES

William Channing Smith, Wilmington, Del., assignor to E. I. du Pont de Nemours and Company, Wilmington, Del., a corporation of Delaware No Drawing. Filed June 7, 1957, Ser. No. 664,165

12 Claims. (Cl. 23—88)

This invention relates to a new process for preparing fluorine compounds. In particular, it concerns a new process for preparing inorganic fluorides.

Inorganic fluorides are well known compounds which range from high-melting salt-like products with ionic bonds to volatile liquid or gaseous products in which the bonds are primarily non-ionic or covalent in character. Because of the wide diversity in properties, the inorganic fluorides are finding increasing application in many fields, for example, public health, pest control, catalysts for organic reactions, polymerization catalysts, fiber preservatives and mordants for dyeing. They can be used as intermediates for production of organic fluorine compounds as described in U.S. Patents 2,709,186, 2,709,187, 2,709,188, and 2,709,190. Although a few inorganic fluorides occur in nature in the form of minerals usually in combination with other inorganic salts, most fluorides must be prepared by synthetic processes. Present processes usually employ elemental fluorine or hydrogen fluoride, both of which are corrosive, difficult to handle and frequently react with exceptional and occasionally uncontrollable vigor.

In the process of the invention inorganic fluorides are prepared by contacting sulfur tetrafluoride with an inorganic compound which contains at least two elements. One element of the latter compound is sulfur, selenium or tellurium. The second element and any additional element in said inorganic compound has an atomic number lying between 11 and 83 and is chosen from groups I, II, III, IV, V, VI–B, VII–B, and VIII of the periodic table as set forth in Deming's "General Chemistry," 5th ed., Wiley, 1944. It is to be understood that both A and B subgroups are included in groups I through V. More specifically the invention can be described as a process for preparing inorganic fluorides which consists in contacting sulfur tetrafluoride with an inorganic sulfide, selenide or telluride which contains one or more elements of atomic number 11 through 83, which are found in groups I, II, III, IV, V, VI–B, VII–B, and VIII of the periodic table.

In one preferred embodiment of the invention, the process is conducted with sulfur tetrafluoride and a sulfide of a metal having an atomic number between 11 and 83 inclusive. The division of elements into metals and non-metals is well recognized in modern chemistry. It is discussed, for example, in Deming's "General Chemistry" (John Wiley and Sons, Inc., 5th ed., chapter 11), or Morgan and Burstall, "Inorganic Chemistry—A Survey of Modern Developments" (W. Heffer and Sons, Ltd., pp. 18–19). The metals, according to the periodic table in Deming's "General Chemistry" are the elements of groups I, II, VIII, III–B, IV–B, V–B, VI–B, VII–B and the elements of groups III–A, IV–A, V–A, and VI–A which have atomic numbers above 5, 14, 33, and 52 respectively.

In a second preferred embodiment of the invention sulfur tetrafluoride is reacted wtih an inorganic sulfide of an element of atomic number lying between 14 and 83 inclusive, which forms a fluoride that boils below 800° C. at 760 mm. The sulfides of these elements are preferred since the fluorides prepared by the process of the invention are obtained in good yields and are readily purified.

The inorganic sulfides, selenides and tellurides can be used in pure form or as mixtures of two or more of the compounds of the elements as defined above. Examples of mixtures of binary compounds which can be used are sulfides of calcium and zinc, sulfides of iron and cobalt, sodium selenide and iron sulfide, sulfides of copper and zinc, and sulfides of cadmium and mercury.

Ternary compounds whcih can be used for example, are copper bismuth sulfide ($CuBiS_2$), potassium iron sulfide ($KFeS_2$) and silver antimony sulfide ($AgSbS_2$).

In the process of the invention all of the sulfur, selenium or tellurium in the inorganic compound is replaced with fluorine. There are thus produced mixtures of inorganic fluorides and sulfur from which the fluoride can be isolated by conventional means such as crystallization, sublimation, extraction or distillation. In some cases the fluorides are obtained as addition compounds with sulfur tetrafluoride. For example, germanium fluoride can be isolated as $GeF_4 \cdot 2SF_4$. There can be present in the reaction mixture compounds which react with the inorganic fluorides as they are formed to yield complex fluorides. For example, sodium or potassium fluoride when present in the reaction with aluminum sulfide can combine with the aluminum fluoride as it is formed to yield $NaAlF_4$ or $KAlF_4$.

The principal by-product of the reaction is sulfur or a mixture of sulfur and selenium or sulfur and tellurium.

Sulfur tetrafluoride, which is used as the fluorinating agent, can be prepared by methods described in the literature (Brown and Robinson, J. Chem. Soc. 1955, 3147–51).

The reaction of the inorganic sulfide, selenide or telluride with sulfur tetrafluoride is conducted under substantially anhydrous conditions in either a batch or continuous flow process. In either process the reaction chamber is preferably made of material resistant to chemical attack by hydrogen fluoride, for example, stainless steel or platinum.

In a batch process a vessel capable of withstanding pressure is preferably flushed with an inert gas, for example, nitrogen to displace the air and is then charged with the inorganic sulfide, selenide or telluride. The chamber is cooled, evacuated and sulfur tetrafluoride then added to the cooled chamber.

The ratio in which the reactants are used is not critical but for maximum yield of product the sulfur tetrafluoride is preferably used in excess. The molar ratio of sulfur tetrafluoride to inorganic sulfide, selenide or telluride will be determined in part by the number of sulfur, selenium or tellurium atoms present in the compound. Generally, at least one half mole of sulfur tetrafluoride is used for each atom of sulfur, selenium or tellurium to be replaced. The quantity of sulfur tetrafluoride can, however, range from 0.1 mole to 20 moles for each atom of sulfur, selenium or tellurium present in the organic sulfide, selenide or telluride.

The temperature of the reaction is kept as low as operability permits and preferably lies between 20° C. and 500° C. The pressure employed is generally autogenous and can lie between about 5 atmospheres and 50 atmospheres. The reaction time for a batch process is generally between about 2 hours and 40 hours but may be longer. During the reaction period, the contents of the reaction vessel are preferably mixed, for example, by mechanical stirring or shaking.

The process of the invention can also be conducted by a continuous flow method wherein the inorganic sulfide, selenide or telluride is placed in a tube of corrosionresistant material. The tube and contents are preferably heated to insure complete removal of moisture and then cooled. Sulfur tetrafluoride gas is then passed through the tube which is heated to a temperature sufficient to cause reaction with the inorganic sulfide, selenide or telluride. Volatile products are collected in traps cooled with, for example, solid carbon dioxide-acetone solution or liquid nitrogen. This process can be run at atmospheric pressure.

The following examples illustrate the process of this invention.

*Example I*

A pressure vessel of 145 ml. capacity, lined with stainless steel, was charged with 19.1 g. (0.2 mole) of copper sulfide (CuS). It was cooled in a solid carbon dioxide-acetone solution, evacuated to about 1 mm. pressure, and charged with 44 g. (0.4 mole) of sulfur tetrafluoride. The mixture was allowed to stand one-half hour at ambient temperature (approximately 25° C.) and then heated with agitation for 3 hours at 150° C. and 3 hours at 350° C. There was obtained 19.22 g. of a gray powder from which copper fluoride was recovered by extraction with water. Copper fluoride can be obtained by evaporation of the blue aqueous solution as $CuF_2 \cdot 4H_2O$.

The above example shows the application of the process to a compound of an element of Group I. By a similar process there can be prepared sodium fluoride from sodium selenide, potassium fluoride from potassium telluride and silver fluoride from silver sulfide.

*Example II*

Using a bomb and process similar to that described in Example I a mixture of 7.2 g. (0.1 mole) of calcium sulfide and 22 g. (0.2 mole) of sulfur tetrafluoride was reacted for 2 hours at approximately 25° C., at 100° C. for 3 hours and at 200° C. for 1 hour. There was obtained 6.44 g. of a mixture of free sulfur and calcium fluoride ($CaF_2$). The presence of calcium fluoride was confirmed by the X-ray diffraction pattern.

*Example III*

A. Using a bomb and process as described in Example I, a mixture of 38.9 g. (0.4 mole) of zinc sulfide and 22 g. (0.2 mole) of sulfur tetrafluoride was heated to 60° C. At this point the reaction became vigorously exothermic and external heating was discontinued. There was obtained 56.29 g. of a granular solid which was a mixture of zinc fluoride and sulfur. The sulfur was removed by extraction of the solid with carbon disulfide. The insoluble residue was substantially pure zinc fluoride ($ZnF_2$) as shown by the following analysis.

*Analysis.*—Calc'd for $ZnF_2$: Zn, 63.24%; F, 36.75%. Found: Zn, 62.29%, 62.50%; F, 33.00%, 33.33%.

B. Zinc sulfide was also reacted with sulfur tetrafluoride using the continuous flow process described in an earlier paragraph. The tube was charged with 15 g. of zinc sulfide and heated to 100° C. while sulfur tetrafluoride was passed into the tube. A vigorous exothermic reaction began at 100° C. and the temperature rose to 340° C. The reaction was continued for 1.5 hours at 200–350° C., a total of 65.6 g. of sulfur tetrafluoride being passed into the tube. There was obtained 18 g. of a white solid from which 3.7 g. of sulfur was extracted with carbon disulfide. The remaining material, approximately 15 g., was zinc fluoride ($ZnF_2$).

*Example IV*

Using a bomb and process similar to that described in Example I, a mixture of 23.9 g. (0.1 mole) of cadmium telluride (CdTe) and 33 g. (0.3 mole) of sulfur tetrafluoride was allowed to stand for 1 hour at air temperature (about 25° C.), then heated at 70° C. for 1 hour, 2 hours at 100° C. and 2 hours at 200° C. There was obtained 13.0 g. of a steel gray solid which was extracted with carbon disulfide to remove sulfur. The remaining solid was extracted with hot water and the aqueous extract added to an aqueous solution of sodium fluoride. Sodium cadmium fluoride ($NaCdF_3$) was obtained as a precipitate.

Cadmium fluoride was also prepared by heating cadmium telluride in a stream of sulfur tetrafluoride at 100–200° C. using the continuous flow process described earlier. Reaction began at 100° C. and was slightly exothermic.

Examples II, III and IV illustrate the invention as applied to compounds of elements of group II. By a similar procedure there can be prepared magnesium fluoride from magnesium selenide, and strontium fluoride from strontium sulfide.

*Example V*

Using a bomb and process similar to that described in Example I, a mixture of 15.0 g. (0.1 mole) of aluminum sulfide ($Al_2S_3$) and 66 g. (0.6 mole) of sulfur tetrafluoride was heated at 40° C. for 1 hour, 250° C. for 1 hour and 450° C. for 5 hours. The reaction became exothermic at temperatures between 340° C. and 450° C. There was obtained 29.6 g. of a grayish-yellow powder which contained free sulfur and aluminum fluoride ($AlF_3$). The free sulfur was removed by extraction of the crude product with carbon disulfide.

Example V illustrates the process as applied to compounds of the elements of group III. There can also be prepared by this process lanthanum fluoride from lanthanum sulfide and gallium fluoride from gallium sulfide.

*Example VI*

Using a bomb and process as described in Example I, a mixture of 36.54 g. (0.2 mole) of stannic sulfide ($SnS_2$) and 22 g. (0.2 mole) of sulfur tetrafluoride was heated at 150° C. for 2 hours and 300° C. for 8 hours. There was obtained 47.86 g. of a grayish white solid which, after removal of the free sulfur by extraction with carbon disulfide, was shown by analysis to contain approximately 83% of stannic fluoride ($SnF_4$).

*Analysis.*—Calc'd for $SnF_4$: F, 39.00%. Found: F, 32.31%.

Example VI illustrates the process as applied to compounds of the elements of group IV. By the same process there can be prepared titanium tetrafluoride from titanium sulfide, zirconium tetrafluoride from zirconium selenide, silicon tetrafluoride from silicon sulfide and germanium tetrafluoride from germanium sulfide.

*Example VII*

Using a bomb and process similar to that described in Example I, a mixture of 22.2 g. (0.05 mole) of phosphorus pentasulfide and 33 g. (0.3 mole) of sulfur tetrafluoride was reacted at ambient temperature (approximately 25° C.) for 1 hour and then heated at 200° C. for 3 hours and 300° C. for 3 hours. The volatile products were collected in a stainless steel cylinder and weighed 31 g. The volatile products were shown by mass spectrographic analysis to contain about 85 mole percent of phosphorus pentafluoride ($PF_5$). There was also obtained 18.8 g. of sulfur as a by-product.

Antimony trifluoride can be prepared from sulfur tetrafluoride and antimony sulfide ore by the process of Example VII. The crude antimony trifluoride is treated with dioxane as described by Haendler, Glazier and Breck, J. Am. Chem. Soc. 75, 3845 (1953), to yield an adduct of antimony trifluoride and dioxane, $SbF_3 \cdot C_4H_8O_2$.

*Analysis.* — Calc'd for $SbF_3 \cdot C_4H_8O_2$: F, 45.62%. Found: F, 46.09%.

Example VII illustrates the process as applied to compounds of elements of group V. There can be prepared by this process arsenic trifluoride from arsenic selenide and bismuth trifluoride from bismuth sulfide and vanadium trifluoride from vanadium sulfide.

Example VIII

Using a bomb and process as described in Example I, a mixture of 32 g. (0.2 mole) of molybdenum sulfide (MoS₂) and 66 g. (0.6 mole) of sulfur tetrafluoride was heated at 200° C. for 2 hours and 350° C. for 4 hours. There was obtained 67.5 g. of a dark, slightly fuming solid which was a mixture of free sulfur and the adduct of molybdenum tetrafluoride and sulfur tetrafluoride, that is $MoF_4 \cdot 2SF_4$.

Another run in which the quantities of reactants and conditions of heating were the same as given above yielded 53.0 g. of the dark fuming solid which contained the adduct as described in the preceding paragraph.

Example VIII illustrates the process as applied to compounds of elements of group VI–B. By this process, tungsten tetrafluoride can be obtained from tungsten disulfide and chromium trifluoride from chromium selenide.

Example IX

Using a bomb and process similar to that described in Example I, a mixture of 20 g. of alabandite ore (manganese sulfide) and 76 g. of sulfur tetrafluoride was heated at 200° C. for 2 hours and 350° C. for 6 hours. There was obtained 17.6 g. of an odoriferous solid which was extracted with carbon disulfide to remove free sulfur. The residue was extracted with hot water and the aqueous extract treated with aqueous sodium fluoride solution to precipitate the manganous fluoride as the adduct, $NaMnF_3$. The manganous fluoride can also be isolated as the ammonium adduct, $NH_4MnF_3$, from which pure manganous fluoride can be obtained by heating at 300° C. in a stream of dry carbon dioxide.

Example IX illustrates the process as applied to compounds of the elements of group VII–B. The process can also be applied to manganese selenide.

Example X

Using a bomb and process similar to that described in Example I, a mixture of 23.8 g. of iron sulfide (pyrites) and 44 grams of sulfur tetrafluoride was heated at 150° C. for 2 hours and 350° C. for 4 hours. There was obtained 32.42 g. of a solid product, which after extraction with carbon disulfide, yielded substantially pure ferric fluoride ($FeF_3$). The identity of the compound was established by X-ray diffraction.

Example X illustrates the process as applied to compounds of the elements of group VIII. There can also be prepared cobalt fluoride ($CoF_2$) from cobalt sulfide, nickel fluoride ($NiF_2$) from nickel selenide, palladium fluoride ($PdF_2$) from palladium sulfide and platinum fluoride ($PtF_2$) from platinum sulfide.

Potassium antimony sulfide ($K_3SbS_3$) when reacted with sulfur tetrafluoride by the process of this invention yields potassium antimony fluoride ($K_3SbF_6$), potassium iron sulfide ($KFeS_2$) yields potassium iron fluoride ($KFeF_4$) and sodium tungsten sulfide ($Na_2WS_4$) yields sodium tungsten fluoride ($Na_2WF_8$).

The preceding examples illustrate the process of the invention as it applies to relatively pure sulfides, selenides and tellurides and to the respective compounds as they occur naturally in minerals and ores.

I claim:

1. The process of preparing a fluoride of a chemically reactive element of atomic number 11–83 selected from groups I–V, inclusive, VI–B, VII–B and VIII of the periodic table which comprises reacting sulfur tetrafluoride under substantially anhydrous conditions with a member of the group consisting of the sulfides, selenides and tellurides of at least one chemically reactive element of atomic number 11–83 selected from groups I–V, inclusive, VI–B, VII–B and VIII of the periodic table.

2. The process of claim 1 wherein the reaction temperature is about 20°–500° C.

3. The method of preparing a metal fluoride which comprises reacting sulphur tetrafluoride under substantially anhydrous conditions with the sulfide of at least one metal of atomic number 11–83 selected from groups I–V, inclusive, VI–B, VII–B and VIII of the periodic table.

4. The method of preparing a metal fluoride which comprises reacting sulfur tetrafluoride under substantially anhydrous conditions with the selenide of at least one metal of atomic number 11–83 selected from groups I–V, inclusive, VI–B, VII–B and VIII of the periodic table.

5. The method of preparing a metal fluoride which comprises reacting sulfur tetrafluoride under substantially anhydrous conditions with the telluride of at least one metal of atomic number 11–83 selected from groups I–V, inclusive, VI–B, VII–B and VIII of the periodic table.

6. The process of preparing a copper fluoride which comprises reacting sulfur tetrafluoride under substantially anhydrous conditions with a copper sulfide.

7. The process of preparing zinc fluoride which comprises reacting sulfur tetrafluoride under substantially anhydrous conditions with zinc sulfide.

8. The process of preparing cadmium fluoride which comprises reacting sulfur tetrafluoride under substantially anhydrous conditions with cadmium telluride.

9. The process of preparing aluminum fluoride which comprises reacting sulfur tetrafluoride under substantially anhydrous conditions with aluminum sulfide.

10. The process of preparing a tin fluoride which comprises reacting sulfur tetrafluoride under substantially anhydrous conditions with a tin sulfide.

11. The process of preparing phosphorus pentafluoride which comprises reacting sulfur tetrafluoride under substantially anhydrous conditions with phosphorus pentasulfide.

12. The process of preparing an iron fluoride which comprises reacting sulfur tetrafluoride under substantially anhydrous conditions with an iron sulfide.

References Cited in the file of this patent

Chem. Abstracts, vol. 42, p. 51C, 1948 (abstracted from J. Gen. Chem. (USSR) 17, 185–192 (1947).

Ind. and Eng. Chem., vol. 42, No. 11, November 1950, p. 2224, left.

Simons: "Fluorine Chemistry," vol. 1, page 7, 1950, published by Academic Press, Inc., New York.